United States Patent [19]

Yokota et al.

[11] 4,128,092

[45] Dec. 5, 1978

[54] INTERNAL COMBUSTION ENGINE WITH AN AUXILIARY COMBUSTION CHAMBER

[75] Inventors: Masato Yokota; Hideo Kobayashi, both of Susono, Japan

[73] Assignee: Toyota Jidosha Kogyo Kabushiki Kaisha, Toyota, Japan

[21] Appl. No.: 788,425

[22] Filed: Apr. 18, 1977

[30] Foreign Application Priority Data

Nov. 15, 1976 [JP] Japan .................... 51-136242

[51] Int. Cl.² ...................... F02B 23/00; F02B 19/10
[52] U.S. Cl. ..................... 123/191 S; 123/193 P; 123/193 CP
[58] Field of Search ............. 123/32 SP, 32 ST, 32 B, 123/191 S, 191 SP, 193 P, 193 CP, 75 B

[56] References Cited

U.S. PATENT DOCUMENTS

| 3,132,633 | 5/1964 | Zimmerman | 123/32 B |
| 3,152,523 | 10/1964 | Whitfield | 123/193 P |
| 3,923,015 | 12/1975 | Mukai | 123/32 SP |
| 3,924,582 | 12/1975 | Yagi | 123/32 ST |
| 4,041,923 | 8/1977 | Konishi | 123/32 SP |
| 4,058,090 | 11/1977 | Suzuki | 123/32 SP |

Primary Examiner—Ronald H. Lazarus
Attorney, Agent, or Firm—Stevens, Davis, Miller & Mosher

[57] ABSTRACT

Disclosed is an internal combustion engine comprising a first auxiliary combustion chamber formed in the cylinder head and connected to the main combustion chamber via a first connecting passage. The spark plug is located in the first connecting passage. The second auxiliary combustion chamber, having no spark plug, is formed in the cylinder head or in the piston. The second auxiliary combustion chamber is connected to the main combustion chamber via a second connecting passage. The second connecting passage opens into the main combustion chamber at a position upon which a burning jet injected from the first connecting passage does not directly impinge.

15 Claims, 17 Drawing Figures ial bore 2 formed in the cylinder block

INTERNAL COMBUSTION ENGINE WITH AN AUXILIARY COMBUSTION CHAMBER

DESCRIPTION OF THE INVENTION

The present invention relates to an internal combustion engine with an auxiliary combustion chamber.

There has been known an internal combustion engine with an auxiliary combustion chamber in which the auxiliary combustion chamber is connected to a main combustion chamber, and a combustible mixture in the main combustion chamber is burned by a burning jet injected from the auxiliary combustion chamber into the main combustion chamber. In an internal combustion engine of this type, a strong burning jet is mainly injected from the auxiliary combustion chamber into the main combustion chamber during the first half of combustion in the main combustion engine, while the burning jet is weakened or extinguished during the latter half of combustion in the main combustion chamber. Consequently, in the portion of the combustible mixture which undergoes combustion caused by the burning jet during the first half of combustion in the main combustion chamber, turbulence is caused by the burning jet, thus, causing turbulent burning of said portion of the combustible mixture. As a result of this, fluctuations of the ignition and of the combustion are reduced and the velocity of the combustion is increased, thereby obtaining a stable combustion. However, during the latter half of combustion in the main combustion chamber, since the burning jet is weakened or extinguished, the combustion becomes the same as that in an ordinary engine without an auxiliary combustion chamber. Thus, a sufficient turbulent burning can not be obtained during the latter half of combustion and, as a result, a stable combustion can not be obtained. Such an unstable combustion occurs particularly when a lean air-fuel mixture is used or a large amount of the exhaust gas is recirculated from the exhaust system into the intake system.

A large part of a torque generated in the engine is created when the piston moves downward to some extent, that is, when the latter half of combustion is effected. Therefore, when a stable combustion cannot be obtained during the latter half of combustion as mentioned above, there is a tendency for the torque to fluctuate.

In addition, in a conventional internal combustion engine with an auxiliary combustion chamber, quenching layers are created on the inner walls of the cylinder head and of the cylinder. However, since the combustible gas in the quenching layers is not sufficiently burned, there is a disadvantage in that a large amount of harmful HC components is produced, particularly when a lean air-fuel mixture is used or when a large amount of the recirculated exhaust gas is fed into the intake system of the engine.

An object of the present invention is to provide an internal combustion engine with an auxiliary combustion chamber capable of obtaining a stable combustion, so as to cause turbulence in the portion of the mixture which undergoes combustion during the latter half of combustion in the main combustion chamber, thereby causing turbulent burning of said portion of the mixture.

Another object of the present invention is to provide an internal combustion engine with an auxiliary combustion chamber capable of burning the unburned gas created on the inner walls of the cylinder head and of the cylinder.

According to the present invention, there is provided an internal combustion engine comprising a cylinder block, a cylinder head fixed onto said cylinder block and having an inner surface, a piston reciprocally movable in said cylinder block and having a top surface, said inner surface and said top surface forming an inner wall defining a main combustion chamber, means for feeding a combustible mixture into said main combustion chamber, means for discharging the exhaust gas from said main combustion chamber into the atmosphere, a bore formed in said cylinder head and defining a first auxiliary combustion chamber and a first connecting passage communicating said first auxiliary combustion chamber with said main combustion chamber, a spark plug disposed in said bore, a second auxiliary combustion chamber formed in said inner wall defining said main combustion chamber, and a second connecting passage communicating said second auxiliary combustion chamber with said main combustion chamber and opening on said inner wall at a position upon which burning jet injected from said first connecting passage does not impinge.

The present invention may be more fully understood from the following description of preferred embodiments of the invention, together with the accompanying drawings.

DESCRIPTION OF PREFERRED EMBODIMENTS

Figure 1:
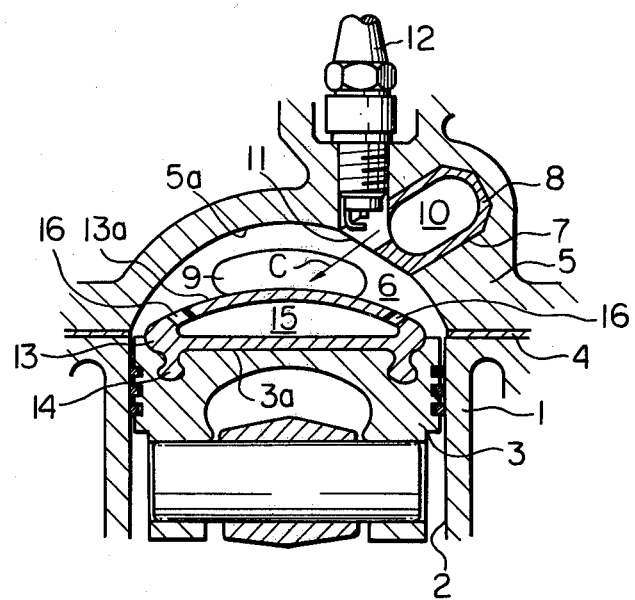
FIG. 1 is a cross sectional side view of an embodiment of an internal combustion engine according to the present invention.

In FIGS. 1 through 17, similar components are indicated with the same reference numerals. Referring to FIG. 1, an internal combustion engine comprises a cylinder block 1, a piston 3 reciprocally movable in a cylinder 2 formed in the cylinder block 1, a cylinder head 5 fixed onto the cylinder block 1 via a gasket 4, an auxiliary chamber component 8 press-fitted into a recess 7 formed in the cylinder head 5, an intake valve 9 and an exhaust valve (not shown). A first auxiliary combustion chamber 10 and a first connecting passage 11 are formed in the auxiliary chamber component 8. The spark gap of a spark plug 12 is located in the connecting passage 11.

According to the present invention, a hollow vessel 13 having a spherical surface 13a is mounted on the top surface 3a of the piston 3 and, a main combustion chamber 6 is formed between the spherical surface 13a and the inner wall 5a of the cylinder head 5. The main combustion chamber 6 is connected to the auxiliary combustion chamber 10 via the connecting passage 11. The hollow vessel 13 is made of a heat resistable material, for example, such as a ceramics consisting of silicon nitride $Si_3N_4$, or made of nickel alloy such as stainless steel. In addition, this hollow vessel 13 is fixed onto the top surface 3a of the piston 3 by bolts or in such a way that the downward projection 14 is embedded in the piston 3 at the same time the piston 3 is formed by the casting operation. The hollow vessel 13 forms therein a second auxiliary combustion chamber 15 having no spark plug and is connected to the main combustion chamber 6 via a plurality of connecting passages 16.

At the time of the intake stroke, a combustible mixture is introduced into the main combustion chamber 6 via the intake valve 9. Then, at the time of the compression stroke, the combustible mixture in the main combustion chamber 6 is forced into the auxiliary combustion chamber 10 via the connecting passage 11 on one hand, and into the second auxiliary combustion chamber 15 via the connecting passages 16 on the other hand. Then, the combustible mixture in the auxiliary combustion chamber 10 is ignited by the spark plug 12 and combustion gas thus formed is injected into the main combustion chamber 6 via the connecting passage 11 as is shown by the arrow C in FIG. 1.

Figure 2:
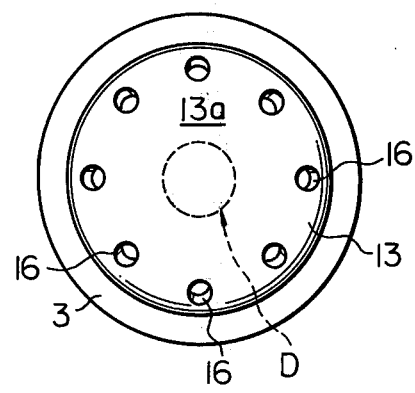
FIG. 2 is a plane view of the piston of FIG. 1.

As is shown in FIG. 1, the axis of the connecting passage 11 is directed to the central portion of the spherical surface 13a of the hollow vessel 13. Consequently, in FIG. 2 showing a plane view of the piston 3, the burning jet injected from the auxiliary combustion chamber 10 impinges upon the region D of the top surface 3a enclosed by the broken line. According to the present invention, the connecting passages 16 are arranged on the spherical surface 13a at positions remote from the region D so that the burning jet injected from the auxiliary combustion chamber 10 does not directly impinge upon the connecting passages 16.

The burning jet injected from the connecting passage 11 causes turbulence of the combustible mixture in the main combustion chamber 6, thereby causing turbulent burning. The combustion flame in the main combustion chamber 6 gradually spreads toward the periphery of the main combustion chamber 6 from the periphery of the burning jet and, the pressure in the main combustion chamber 6 rises, whereby the piston 3 moves downwards. When the pressure in the main combustion chamber 6 rises, the unburned gas existing in the peripheral portion of the main combustion chamber 6 is forced into the second auxiliary combustion chamber 15 via the connecting passages 16, whereby the pressure in the second auxiliary combustion chamber 15 rises. When the piston 3 further moves downward and the combustion flame reaches the peripheral portion of the main combustion chamber 6, the flame enters into the second auxiliary combustion chamber 15 via the connecting passages 16, whereby the combustible mixture in the second auxiliary combustion chamber 15 is ignited. Since the pressure of the combustible mixture in the second auxiliary combustion chamber 15 is relatively high and the combustible mixture in the second auxiliary combustion chamber 15 is burned at constant volume, the combustion pressure in the second auxiliary combustion chamber 15 becomes larger than that in the main combustion chamber 6. As a result of this, a strong burning jet is injected into the main combustion chamber 6 from the second auxiliary combustion chamber 15 via the connecting passages 16. This burning jet causes turbulence of the unburned gas existing in the peripheral portion of the main combustion chamber 6, thus, causing turbulent burning of said unburned gas. As a result of this, the velocity of the combustion is increased, whereby an extremely stable combustion can be obtained during the latter half of combustion in the main combustion chamber 6.

In addition, as is shown in FIG. 1, the connecting passages 16 are so arranged that the burning jet injected from the connecting passages 16 moves forward along the inner wall of the cylinder 2 and, successively, along the inner wall 5a of the cylinder head 5. Consequently, the unburned gas contained in the quenching layer formed on the inner walls of the cylinder 2 and of the cylinder head 5 is burned by the burning jet injected from the connecting passages 16, thereby preventing unburned HC components to be produced.

As mentioned above according to the present invention, the connecting passages 16 are arranged at positions in which the combustible mixture in the second auxiliary combustion chamber 15 is ignited after completion of the first half of combustion in the main combustion chamber 6. The velocity of the combustion during the latter half of combustion is increased due to the burning jet injected from the second auxiliary combustion chamber 15, whereby a stable combustion can be obtained during the latter half of combustion, thus reducing the fluctuation of torque generated in the engine.

Figure 3:
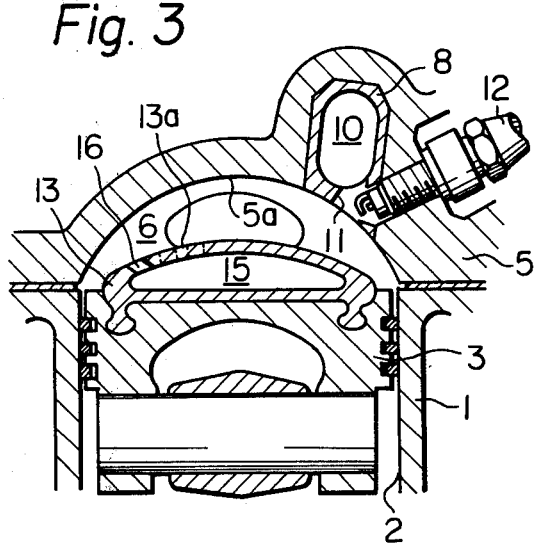
FIG. 3 is a cross sectional side view of a second embodiment according to the present invention.
Figure 4:
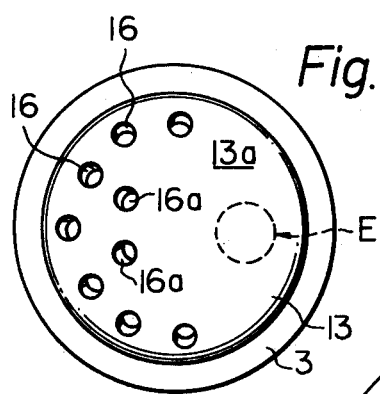
FIG. 4 is a plane view of the piston of FIG. 3.

FIGS. 3 and 4 show a second embodiment according to the present invention. Referring to FIG. 3, the connecting passage 11 opens into the main combustion chamber 6 towards the peripheral portion of the spherical surface 13a of the hollow vessel 13 so that the burning jet injected from the connecting passage 11 impinges upon the region E on the spherical surface 13a enclosed by the broken line in FIG. 4. In this case, as is shown in FIG. 4, the connecting passages 16 are arranged on the spherical surface 13a at positions remote from the region E. In addition, in this embodiment, two connecting passages 16a are so arranged that the burning jet injected from these connecting passage 16a directly impinges upon the inner wall 5a of the cylinder head 5, whereby unburned gas contained in the quenching layer formed on the inner wall 5a of the cylinder head 5 can be effectively burned.

Figure 5:
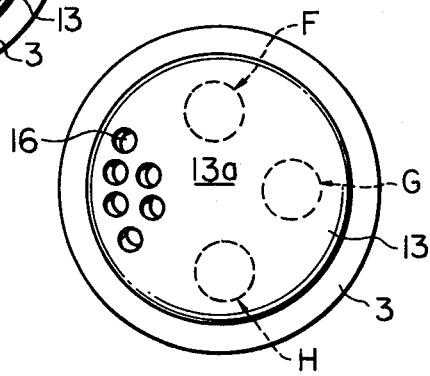
FIG. 5 is a plane view of a piston showing a third embodiment in a similar manner to FIG. 4.

FIG. 5 shows a third embodiment according to the present invention. This embodiment shows the case where three connecting passages (not shown) communicating the auxiliary combustion chamber 10 with the main combustion chamber 6 (see FIG. 3) are provided and the burning jets injected from said three connecting passages impinge upon the regions F, G and H on the spherical surface 13a enclosed by broken lines, respectively. In this embodiment, the connecting passages 16 are arranged on the spherical surface 13a at positions remote from the regions F, G and H.

Figure 6:
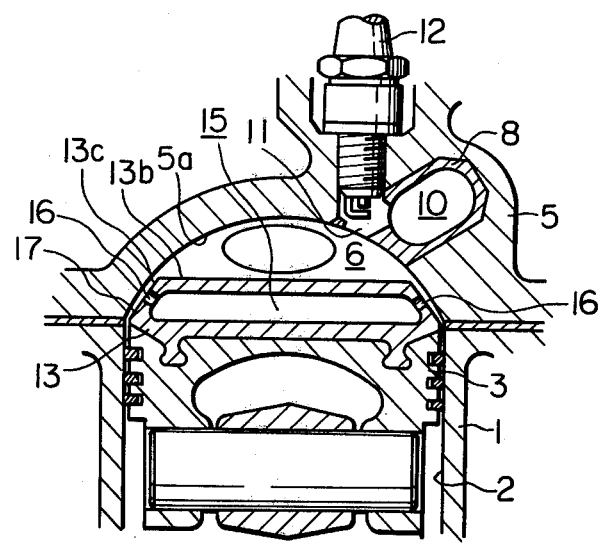
FIG. 6 is a cross sectional side view of a fourth embodiment according to the present invention.
Figure 7:
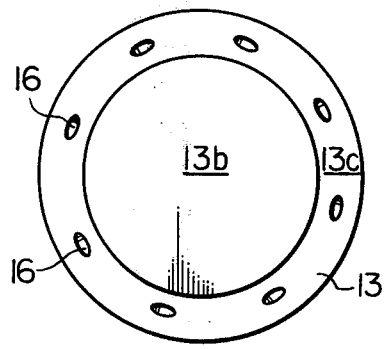
FIG. 7 is a plane view of the piston of FIG. 6.

FIGS. 6 and 7 show a fourth embodiment according to the present invention. Referring to FIG. 6, the hollow vessel 13 has a flat top surface 13b and a spherical shape peripheral surface 13c. The squish area 17 is formed between the spherical shape peripheral surface 13c and the inner wall 5a of the cylinder head 5. The opening of the connecting passage 11 is directed to the central portion of the flat top surface 13b, and the connecting passages 16 are formed on the peripheral surface 13c. By forming the squish area 17 between the peripheral surface 13c and the inner wall 5a of the cylinder head 5, a strong turbulence of the combustible mixture is created in the second auxiliary combustion chamber 15, whereby the velocity of the combustion in the second auxiliary combustion chamber 15 is further quickened, thus obtaining an extremely stable combustion.

Figure 8:
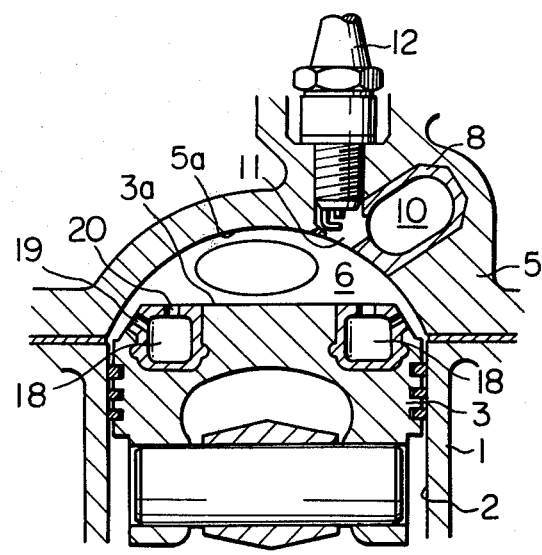
FIG. 8 is a cross sectional side view of a fifth embodiment according to the present invention.
Figure 9:
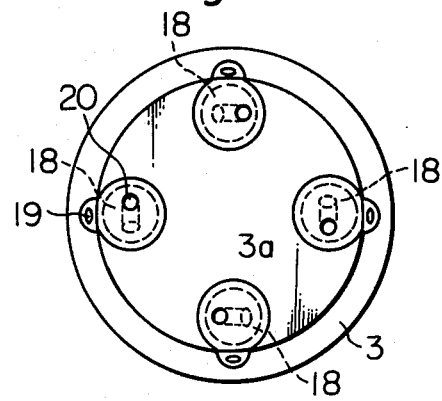
FIG. 9 is a plane view of the piston of FIG. 8.

FIGS. 8 and 9 show a fifth embodiment according to the present invention. In this embodiment, the opening of the connecting passage 11 is directed toward the central portion of the top surface 3a of the piston 3, and a plurality of the auxiliary combustion chambers 18 are arranged on the peripheral portion of the top surface 3a of the piston 3. Each of the auxiliary combustion chambers 18 is connected to the main combustion chamber 6 via two connecting passages 19 and 20. The connecting passage 19 is so arranged that its opening is directed to the inner wall of the cylinder 2 when the piston 3 moves downward, while the connecting passage 20 is so arranged that the burning jet injected therefrom moves forward along the inner wall 5a of the cylinder head 5. In this embodiment, only a single auxiliary combustion chamber 18 may be arranged on the top surface 3a of the piston 3.

Figure 10:
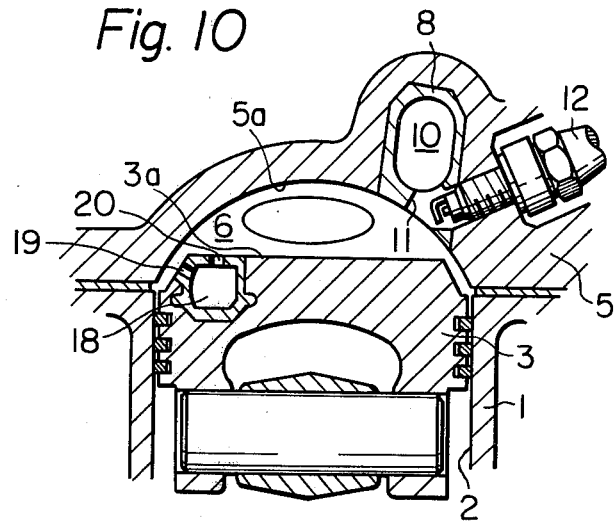
FIG. 10 is a cross sectional side view of a sixth embodiment according to the present invention.
Figure 11:
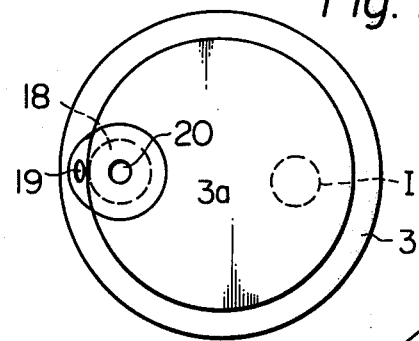
FIG. 11 is a plane view of the piston of FIG. 10.

FIGS. 10 and 11 show a sixth embodiment according to the present invention. In this embodiment, the opening of the connecting passage 11 is directed to the peripheral portion of the top surface 3a of the piston 3 so that the burning jet injected from the connecting passage 11 impinges upon the region I on the top surface 3a enclosed by the broken line in FIG. 11. The second auxiliary combustion chamber 18 is formed on the top surface 3a of the piston 3 at a position remote from the region I and is connected to the main combustion chamber 6 via two connecting passages 19 and 20. The connecting passage 19 is so arranged that its opening is directed to the inner wall of the cylinder 2, while the opening of the connecting passage 20 is directed to the inner wall 5a of the cylinder head 5.

Figure 12:
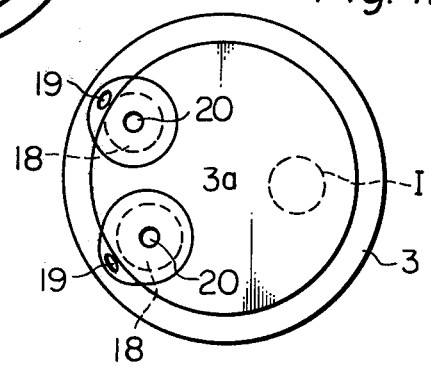
FIG. 12 is a plane view of a piston showing a seventh embodiment in a similar manner to FIG. 11.

FIG. 12 shows a seventh embodiment according to the present invention. In this embodiment, a plurality of the second auxiliary combustion chambers 18, each having two connecting passages 19 and 20 similar to those in FIG. 10, are arranged on the top surface 3a of the piston 3.

Figure 13:
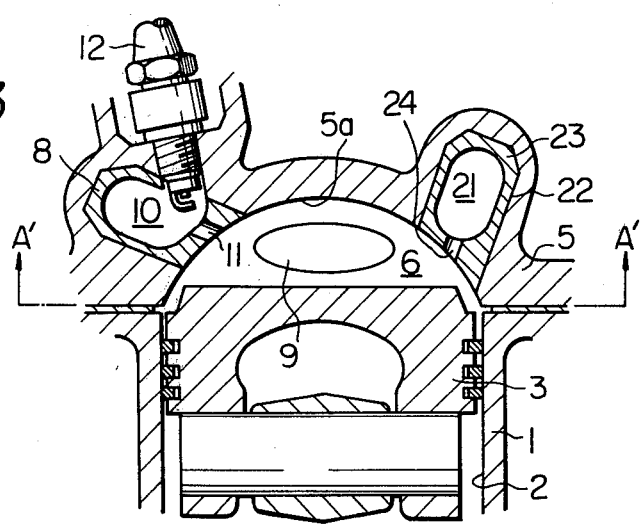
FIG. 13 is a cross sectional side view of an eighth embodiment taken along the line A—A in FIG. 14.
Figure 14:
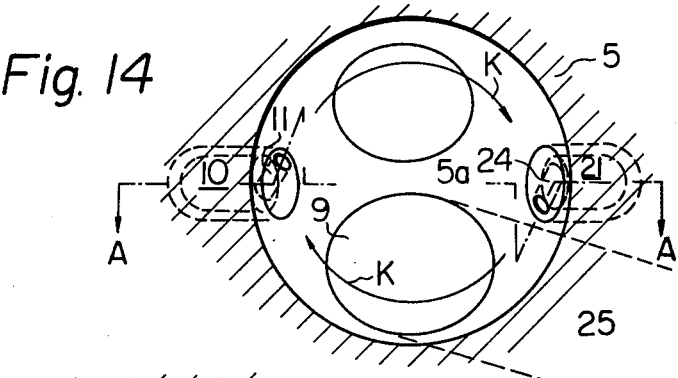
FIG. 14 is a bottom view of the cylinder head taken along the line A'—A' in FIG. 13.

FIGS. 13 and 14 show an eighth embodiment according to the present invention. In this embodiment, a second auxiliary combustion chamber 21, having no spark plug, is formed in the cylinder head 5 at a position opposite to the auxiliary combustion chamber 10 with respect to the axis of the cylinder 2. The second auxiliary combustion chamber 21 is formed in a second auxiliary chamber component 23 press-fitted into a recess 22 formed in the cylinder head 5. The connecting passage 11 of the auxiliary combustion chamber 10 is so arranged that the burning jet injected from the connecting passage 11 swirls along the peripheral portion of the inner wall 5a of the cylinder head 5 as is shown by the arrow K in FIG. 14, while the opening of a connecting passage 24 communicating the second auxiliary combustion chamber 21 and the main combustion chamber 6 is directed toward the same direction as that of the swirl motion K. In this embodiment, it is preferable that an intake port 25 connected to the main combustion chamber 6 via the intake valve 9 be arranged as shown by the broken line in FIG. 14, whereby a combustible mixture introduced into the main combustion chamber 6 via the intake valve 9 swirls in the same direction as that of the swirl motion K of the burning jet injected from the connecting passage 11.

Figure 15:
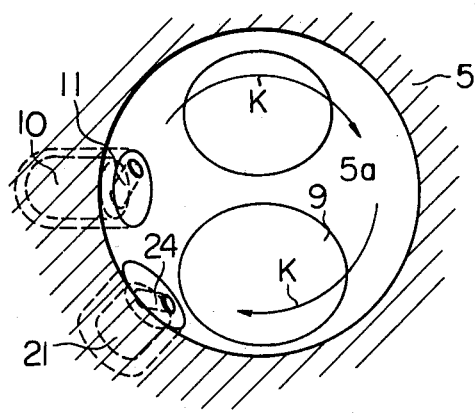
FIG. 15 is a bottom view of a cylinder head showing a ninth embodiment in a similar manner to FIG. 14.

FIG. 15 shows a ninth embodiment according to the present invention. In this embodiment, the second auxiliary combustion chamber 21 shown in FIG. 13 is disposed in the vicinity of the auxiliary combustion chamber 10, and the connecting passage 24 of the second auxiliary combustion chamber 21 opens into the main combustion chamber 6 so as to confront the stream of the burning jet. The embodiment shown in FIG. 15 can prolong the time before the combustible mixture in the second auxiliary combustion chamber 21 is ignited after the burning jet is injected from the connecting passage 11, compared with the embodiment shown in FIG. 13.

Figure 16:
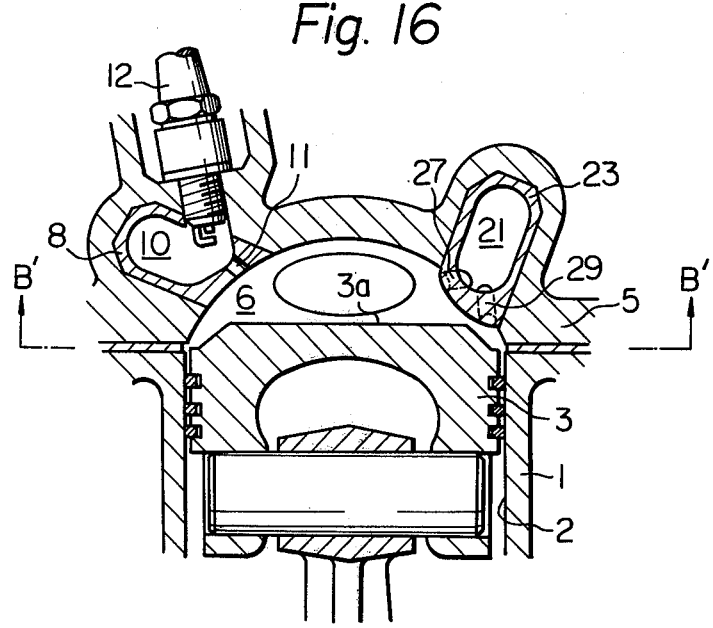
FIG. 16 is a cross sectional side view of a tenth embodiment taken along the line B—B in FIG. 17.
Figure 17:
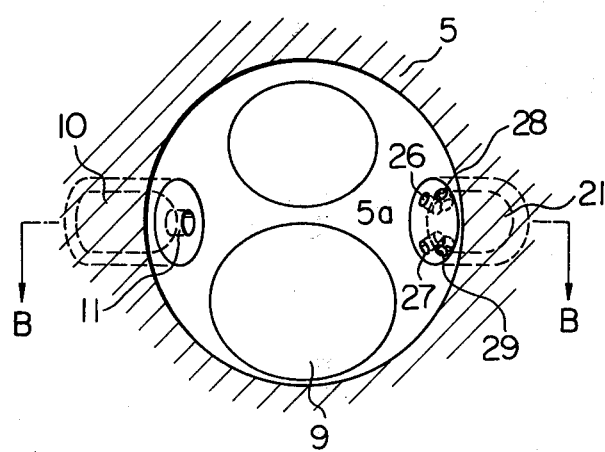
FIG. 17 is a bottom view of the cylinder head taken along the line B'—B' in FIG. 16.

FIGS. 16 and 17 show a tenth embodiment according to the present invention. In this embodiment, the second auxiliary combustion chamber 21 is formed in the cylinder head 5 at a position opposite to the auxiliary combustion chamber 10 with respect to the axis of the cylinder 2. The opening of the connecting passage 11 of the auxiliary combustion chamber 10 is directed toward the central portion of the top surface 3a of the piston. The second auxiliary combustion chamber 21 has four connecting passages 26, 27, 28 and 29, as shown in FIG. 17. The connecting passages 26 and 27 are so arranged that the burning jets injected therefrom move forward along the inner wall 5a of the cylinder head 5, while the connecting passages 28 and 29 are so arranged that the burning jets injected therefrom move forward along the inner wall of the cylinder 2.

In an internal combustion engine according to the present invention, a mixture having an air-fuel ratio near the stoichiometric air-fuel ratio or a lean air-fuel mixture can be used as a combustible mixture fed into the cylinder of the engine. In addition, in order to reduce the amount of harmful $NO_x$ components in the exhaust gas, the exhaust gas can be recirculated into the intake system from the exhaust system of the engine. In this case, it is necessary to provide an exhaust gas recirculating system for recirculating the exhaust gas from the exhaust system into the intake system.

According to the present invention, since a stable combustion can be obtained over the entire period during which combustion is effected, the fluctuation of a torque generated in the engine is reduced. In addition, since the combustible gas in the quenching layer formed on the inner walls of the cylinder and of the cylinder head is burned, the amount of harmful HC components in the exhaust gas can be reduced.

While the invention has been described by referring to specific embodiments chosen for purposes of illustration, it should be apparent that numerous modifications could be made thereto by those skilled in the art without departing from the spirit and scope of the invention.

What is claimed is:

1. An internal combustion engine comprising:
   a cylinder block;
   a cylinder head fixed onto said cylinder block and having an inner surface;
   a piston reciprocally movable in said cylinder block and having a top surface, said inner surface and said top surface forming a wall defining a main combustion chamber;
   means for feeding a combustible mixture into said main combustion chamber;
   means for discharging the exhaust gas from said main combustion chamber into the atmosphere;
   a bore formed in said cylinder head defining a first auxiliary combustion chamber having a first connecting passage of a cross-sectional area which is smaller than that of said first auxiliary combustion chamber, said first connecting passage defining a path of flow from said auxiliary combustion chamber solely to said main combustion chamber;
   a single spark plug located in said bore;
   a second auxiliary combustion chamber formed in said wall defining said main combustion chamber having a second connecting passage of a cross-sectional area which is smaller than that of said second auxiliary combustion chamber and which opens on said inner wall at a position remote from the path of flow of said first connecting passage so that a burning jet injected from said first connecting passage does not directly impinge upon said second connecting passage, said second auxiliary combustion chamber being connected via said second connecting passage solely to said main combustion chamber;
   said first and second auxiliary combustion chambers being mutually isolated except through said main combustion chamber.

2. An internal combustion engine as claimed in claim 1, wherein said second auxiliary combustion chamber is formed on said piston.

3. An internal combustion engine as claimed in claim 2, wherein said second auxiliary combustion chamber is formed in a hollow vessel made of a heat resistable material and fixed onto the top surface of said piston so as to cover the entire region of the top surface of said piston.

4. An internal combustion engine as claimed in claim 3, wherein said hollow vessel has a spherical surface exposed to said main combustion chamber, the path of flow from said first connecting passage being directed toward the central portion of the spherical surface of said hollow vessel, a plurality of said second connecting passages being formed on the peripheral portion of the spherical surface of said hollow vessel.

5. An internal combustion engine as claimed in claim 3, wherein said hollow vessel has a spherical surface exposed to said main combustion chamber, the opening of said first connecting passage being directed toward the peripheral portion of the spherical surface of said hollow vessel, a plurality of said second connecting passages being formed on the peripheral portion of said spherical surface at a position remote from the peripheral portion of said spherical surface toward which said first connecting passage is directed.

6. An internal combustion engine as claimed in claim 3, wherein said hollow vessel has a flat top surface exposed to said main combustion chamber and a peripheral surface portion facing with the inner surface of said cylinder head, a plurality of said second connecting passages being formed on the peripheral surface portion of said hollow vessel, a squish area being formed between said peripheral surface portion and the inner surface of said cylinder head.

7. An internal combustion engine as claimed in claim 2, wherein the path of flow defined by said first connecting passage is directed toward the central portion of the top surface of said piston, and wherein a third as well as said second auxiliary combustion chamber are formed on the peripheral portion of the top surface of said piston.

8. An internal combustion engine as claimed in claim 7, wherein each of said second auxiliary combustion chamber has two second connecting passages, one of said second connecting passages opening into said main combustion chamber towards the inner surface of said cylinder head, while the other connecting passage opens into said main combustion chamber towards the radial direction of said piston.

9. An internal combustion engine as claimed in claim 2, wherein the opening of said first connecting passage is directed toward the peripheral portion of the top surface of said piston and at least one second auxiliary combustion chamber is formed on the peripheral portion of said top surface at a position remote from the peripheral portion of said top surface toward which the opening of said first connecting passage is directed.

10. An internal combustion engine as claimed in claim 9, wherein said second auxiliary combustion chamber has two second connecting passages, one of said second connecting passages opening into said main combustion chamber towards the inner surface of said cylinder head, while the other connecting passage opens into said main combustion chamber towards the radial direction of said piston.

11. An internal combustion engine as claimed in claim 1, wherein a third as well as said first auxiliary combustion chamber is formed in said cylinder head.

12. An internal combustion engine as claimed in claim 11, in which said piston has a central axis, wherein said second auxiliary combustion chamber is arranged at a position located opposite to said first auxiliary combustion chamber with respect to the central axis of said piston.

13. An internal combustion engine as claimed in claim 12, wherein said first connecting passage opens into said main combustion chamber tangentially to the inner wall of said cylinder head so as to create a swirl motion of a burning jet injected from said first connecting passage, the opening of said second connecting passage being directed toward the same direction of said swirl motion.

14. An internal combustion engine as claimed in claim 12, in which said cylinder block has therein a cylinder bore having an inner surface, wherein the opening of said first connecting passage is directed toward the central portion of the top surface of said piston, said second auxiliary combustion chamber having at least two second connecting passages, the opening of one of said second connecting passages being directed toward the inner surface of said cylinder head, while the opening of the other passage being directed toward the inner surface of said cylinder bore.

15. An internal combustion engine as claimed in claim 11, wherein said second auxiliary combustion chamber is disposed in the vicinity of said first auxiliary combustion chamber, said first connecting passage opening into said main combustion chamber tangentially to the inner surface of said cylinder head, while said second connecting passage opens into said main combustion chamber tangentially to the inner surface of said cylinder head in the direction opposite to that of the opening of said first connecting passage.

* * * * *